(12) United States Patent
Del Pinto

(10) Patent No.: US 10,131,416 B2
(45) Date of Patent: Nov. 20, 2018

(54) INTEGRALLY MOLDED ATTACHMENT MEMBERS FOR PANELS FOR AIRCRAFT LINERS

(71) Applicant: C&D ZODIAC, INC., Huntingtong Beach, CA (US)

(72) Inventor: James Edward Del Pinto, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 216 days.

(21) Appl. No.: 15/291,582

(22) Filed: Oct. 12, 2016

(65) Prior Publication Data

US 2017/0101169 A1 Apr. 13, 2017

Related U.S. Application Data

(60) Provisional application No. 62/240,380, filed on Oct. 12, 2015.

(51) Int. Cl.
*B64C 1/06* (2006.01)
*B29C 35/16* (2006.01)
(Continued)

(52) U.S. Cl.
CPC ............... *B64C 1/066* (2013.01); *B29C 35/16* (2013.01); *B29C 51/08* (2013.01); *B29C 65/4835* (2013.01); *B29C 65/5057* (2013.01); *B29C 66/112* (2013.01); *B29C 66/114* (2013.01); *B29C 66/30326* (2013.01);
(Continued)

(58) Field of Classification Search
CPC ......... B29C 35/16; B29C 51/08; B29C 69/00; B29C 66/919; B29C 66/742; B29C 66/7392; B29C 66/73117; B29C 66/72143; B29C 65/4835; B29C 65/5057; B29C 66/112; B29C 66/114; B29C 66/30326; B29C 66/3494; B29C 66/474; B29C 66/7212; B29L 2031/3076; B64C 1/066; B29K 2309/08; B29K 2307/04; B29K 2309/14; B29K 2233/20
See application file for complete search history.

(56) References Cited

U.S. PATENT DOCUMENTS 5,475,956 A 12/1995 Agrawal et al.
5,536,344 A 7/1996 Van Dreumel
(Continued)

FOREIGN PATENT DOCUMENTS

JP 53141343 12/1978

OTHER PUBLICATIONS

EP16193552.3 Extended Search Report dated Feb. 23, 2017.

*Primary Examiner* — Vishal I Patel
(74) *Attorney, Agent, or Firm* — Jeffer Mangels; Butler & Mitchell LLP; Brennan C. Swain, Esq.

(57) ABSTRACT

A method of making a panel assembly that includes forming a thermoplastic panel, placing a thermoset portion into a pocket in a mold, placing an attachment member into the pocket in the mold, positioning the thermoplastic panel in the mold, cooling the thermoplastic panel while heating the thermoset portion to flow at least a portion of the thermoset portion into openings defined in the thermoplastic panel, and cooling the panel assembly so that the thermoset portion hardens, thereby securing the attachment member to the thermoplastic panel.

6 Claims, 1 Drawing Sheet

(51) Int. Cl.
    *B29C 65/48*    (2006.01)
    *B29C 65/50*    (2006.01)
    *B29C 65/00*    (2006.01)
    *B29C 51/08*    (2006.01)
    B29L 31/30     (2006.01)
    B29C 69/00     (2006.01)

(52) U.S. Cl.
    CPC ........ *B29C 66/3494* (2013.01); *B29C 66/474* (2013.01); *B29C 66/7392* (2013.01); *B29C 66/7212* (2013.01); *B29C 66/72143* (2013.01); *B29C 66/73117* (2013.01); *B29C 66/742* (2013.01); *B29C 66/919* (2013.01); *B29C 69/00* (2013.01); *B29L 2031/3076* (2013.01)

(56) References Cited

U.S. PATENT DOCUMENTS

| | | | |
|---|---|---|---|
| 5,713,706 A | * | 2/1998 | Lozano ............... B29C 65/0672 411/171 |
| 9,358,703 B2 | | 6/2016 | Matsen et al. |
| 2009/0072086 A1 | | 3/2009 | Smith et al. |
| 2009/0235599 A1 | | 9/2009 | Ware et al. |
| 2011/0108667 A1 | | 5/2011 | Keller et al. |
| 2011/0290774 A1 | | 12/2011 | Denante |

\* cited by examiner

INTEGRALLY MOLDED ATTACHMENT MEMBERS FOR PANELS FOR AIRCRAFT LINERS

CROSS-REFERENCE TO RELATED APPLICATIONS

This application claims the benefit of U.S. Provisional Application No. 62/240,380, filed Oct. 12, 2015, which is herein incorporated by reference in its entirety.

FIELD OF THE INVENTION

The present invention relates to aircraft panels with attachment points molded therein.

BACKGROUND OF THE INVENTION

Conventional panels used in aircraft are typically uniform in cross-sectional strength, and are not optimized for part installations. As a result, to provide structural improvement to panels, the only option is to bond a doubler or wet-lay-up support on the back of the panel. The prior art in manufacturing thermoplastic sheet stock has focused on a light weight scrim added to the bottom of the paper layers to create a support for material during the forming process. The scrim is often not considered structural and is in many ways a sacrificial layer, as it cannot stretch during the forming process and tears as needed in molding.

SUMMARY OF THE PREFERRED EMBODIMENTS

In accordance with a first aspect of the present invention there is provided a method of making a panel assembly that includes forming a thermoplastic panel, placing a thermoset portion into a pocket in a mold, placing an attachment member into the pocket in the mold, positioning the thermoplastic panel in the mold, cooling the thermoplastic panel while heating the thermoset portion to flow at least a portion of the thermoset portion into openings defined in the thermoplastic panel, and cooling the panel assembly so that the thermoset portion hardens, thereby securing the attachment member to the thermoplastic panel. In a preferred embodiment, the panel assembly includes a plurality of thermoset portions and respective attachment members. Preferably, the panel assembly is an aircraft side panel or ceiling panel. The attachment member can be comprised of metal and can be any one or more of a bracket, a flange, a threaded fastener, a boss, a ring, an insert for receiving a threaded fastener, a slide-in strips, a holding mechanism for a slide-in strip, an anchor points for a window reveal or a receiver.

In accordance with another aspect of the present invention there is provided a panel assembly that includes a thermoplastic panel having at least one attachment member secured thereto. The attachment member is secured to the thermoplastic panel by a thermoset material. In a preferred embodiment, the thermoplastic panel comprises a plurality of openings therein and the thermoset material at least partially fills the openings.

The present invention relates to integrally molded attachment schemes for thermoformable plastic reinforced panels for aircraft liners (e.g., ceiling panels, sidewalls, etc.). The invention provides high strength anchor points and molded in features for attachment of a sidewall or other interior lining system into an aircraft fuselage.

In a preferred embodiment, the liner thermoformable panel is made of short and/or medium length fibers and a matrix comprised of a thermoplastic resin, such as polyetherimide (PEI), polyphenylsulphone (PPSU), polyphenylene sulfide (PPS), polyoxymethylene/acetal (POM), acrylic (PMMA), fluoropolymers (PTFE, FEP, PVF), ketone-based systems (PEK, PEEK, PEKK), polyimide, polycarbonate (PC), polyethylene (PE), polyphenyleneether (PPE), polyphthalamide (PPA), polypropylene (PP), styrenic systems (ABS, PS, etc.), other sulfone based systems (PES, PSU), urethane and polyurethane (PUR, TPU, etc.), vinyl based systems (PVC, CPVC, etc.) and polyarylamide (PAA) and possibly a binder resin. The molded in attachment features are accomplished on the thermoform part using a thermoplastic resin and chopped fiber Sheet Molding Compound (SMC), or Bulk Molding Compound (BMC). As the thermoform sheet is brought to a plastic state (often temperatures exceeding 500° F.) it is shuttled in a forming machine over to a mold—typically maintained at 250°-350° F. The matched metal die mold in effect cools the material while forming the part. The SMC Material (e.g., a matrix resin of epoxy, vinyl ester, or phenolic resin) and chopped glass or carbon strands is inserted (manually or by a machine—robotically) into the forming mold die. As the tool is closed and the thermoplastic sheet formed and shaped, the molding compound becomes mobile and flows through the substrate, co-mingling with the thermoplastic matrix, permanently molding in the attachment feature.

Features such as the anchor points for window reveals can be molded into the panel. Conventional fixturing of sidewalls employing slide-in strips—the holding mechanisms for the slide-in strips can be co-molded or post molded directly onto the part. It will be appreciated that most in the industry bond attachment schemes to the exterior of the panel rather than mold the features into the part. The present invention molds a thermoset SMC or BMC into a thermoplastic panel. The present invention also contemplates a product or panel assembly created by the method or process described herein.

See U.S. Patent Publication Nos. 2009/0072086 and 2011/0108667, and U.S. Pat. No. 9,358,703, the entireties of which are incorporated by reference herein, for a discussion of thermoplastic panels.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
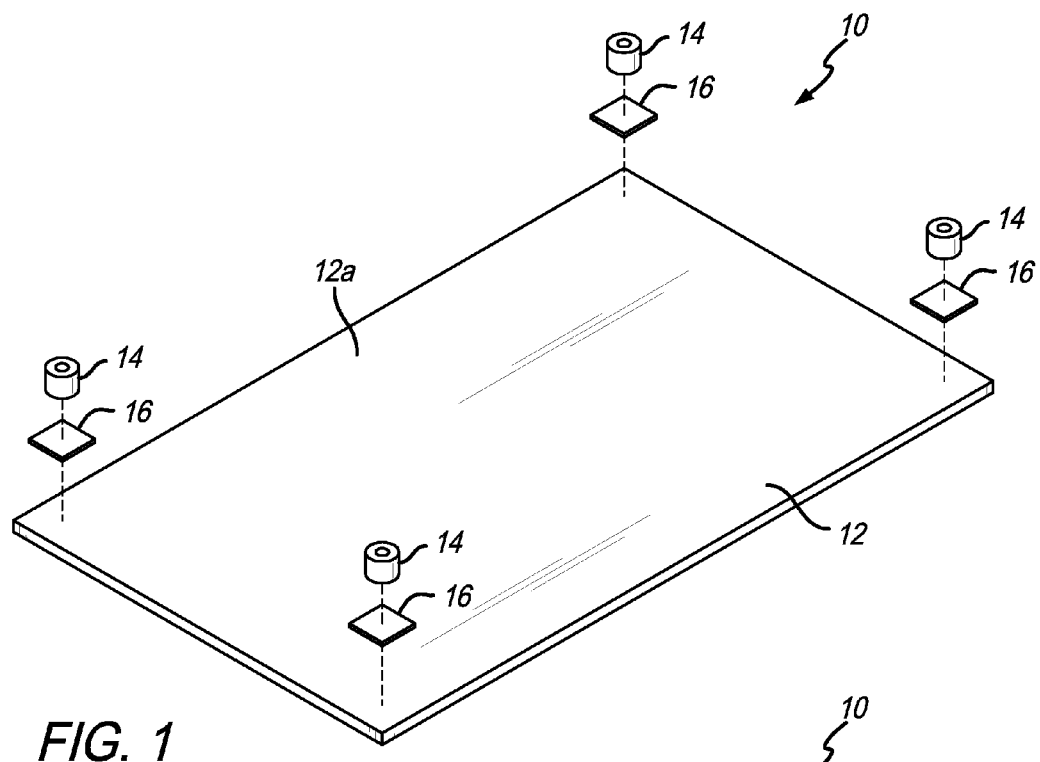
FIG. 1 is an exploded perspective view of a panel assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Figure 2:
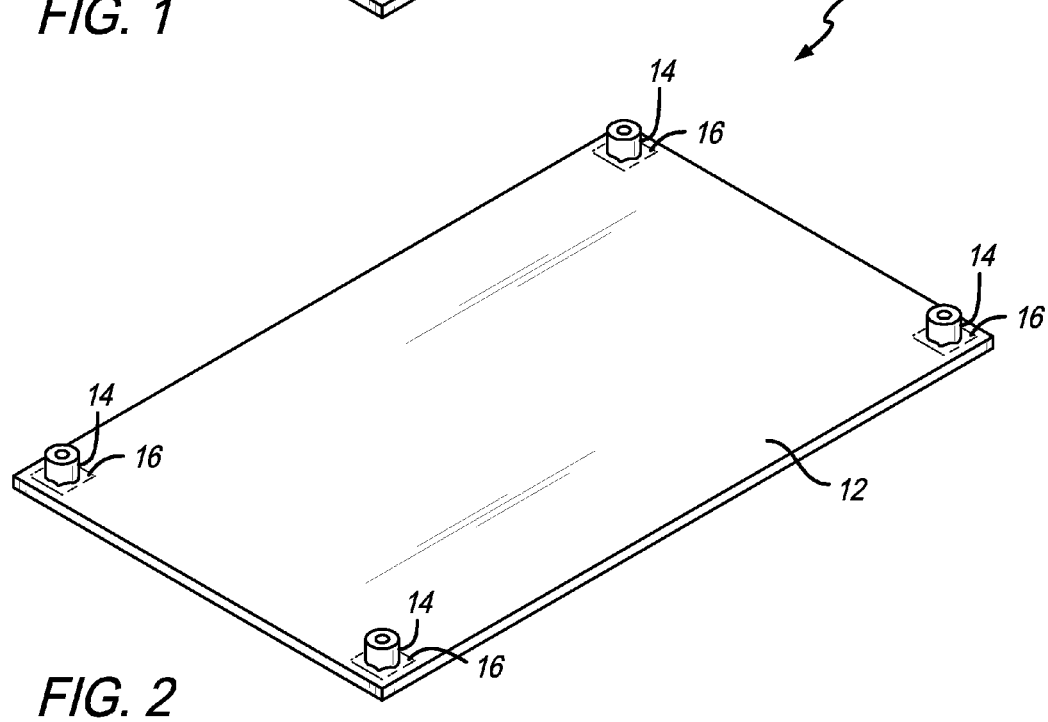
FIG. 2 is a perspective view of the panel assembly of FIG. 1.

Referring now to the drawings, which are for purposes of illustrating the present invention and not for purposes of limiting the same, FIGS. 1-2 show a panel assembly 10 that includes a panel 12 having attachment members 14 integrally molded thereto. As described herein, the panel assembly is intended to be used in an aircraft (e.g., side panel, ceiling panel, etc.). However, this is not a limitation on the present invention and the panel assembly can be used elsewhere.

As will be appreciated by those of ordinary skill in the art, the panel 12 comprises a plurality of layers of thermoplastic. Each layer is typically made of short and/or medium length fibers (e.g., fiberglass, carbon fiber, basalt fiber, quartz or partially oxidized polyactrynitrile (PAN)) and a matrix comprised of a thermoplastic resin. The attachment members 14 can be any component that is typically secured to aircraft panels for attaching the panel to the aircraft frame and the like. For example, the attachment members 14 can be brackets, flanges that attach to brackets on the frame, threaded fasteners, bosses, rings, inserts for receiving a threaded fastener, slide-in strips or the holding mechanisms for the slide-in strips, anchor points for window reveals, a receiver or any other component for attaching the panel to the frame. The attachment members 14 are often made of metal or hard plastic. However, the type of material is not a limitation on the present invention. In a preferred embodiment, a thermoset sheet molding compound or bulk molding compound (referred to herein as SMC, BMC or a thermoset portion 16) is used to secure the attachment member 14 to the panel 12 during the molding of the thermoplastic panel 12. The thermoplastic panel 12 generally comprises a number of layers that are pressed together in a thermal form press. During this procedure, the thermoplastic material heats up and becomes plastic, above the glass transition temperature, (e.g., above 700°). In a preferred embodiment, the temperature range for creating the thermoplastic panel 12 in a thermoform press or shuttle is between about 450° F. and about 800° F. and in a more preferred embodiment the temperature range is between about 600° F. and about 750° F. The thermoplastic panel 12 is then placed in a mold that is typically maintained at about 250° to about 350° F. The thermoset portions 16 are placed in the mold (e.g., in a trough or depression in the mold) prior to raising the temperature. At the raised temperature, the thermoset portion 16, which has a much lower molding temperature or glass transition temperature and melting temperature than the thermoplastic panel, becomes fluid and welds or integrates into the thermoplastic panel 12. Therefore, in the mold, the thermoplastic panel 12 is cooling, while the thermoset portion 16 is rising in temperature and being melted. This allows the thermoplastic and thermoset to mold together or be welded together. It should be understood that the thermoplastic panel 12 has pores, pockets or voids in it that the fluid thermoset portion 16 enters or fills. The matched metal die mold cools the material while forming the panel assembly 10. The thermoset portion 16 (e.g., a matrix resin of epoxy, vinyl ester, or phenolic resin) and chopped glass or carbon strands is inserted (manually or by a machine—robotically) into the forming mold die. As the tool is closed and the panel assembly 10 is formed and shaped, the molding compound thermoset portion 16) becomes mobile and flows through the substrate, co-mingling with the thermoplastic matrix, permanently molding in the attachment member 14. It will be appreciated that different attachment members can be incorporated into the same thermoplastic panel 12. In another embodiment, all of the attachment members 14 within a panel assembly 10 are the same.

Generally, the steps for creating the panel assembly 10 include heating layers in a shuttle above their glass transition temperature to form a thermoplastic panel 12, placing the thermoset portions 16 into locations (e.g., pockets) in the tool, placing the attachment members 14 into locations in the tool, moving the thermoplastic panel 12 to the matched metal die, mold or tool, cooling the thermoplastic panel 12 while heating the thermoset portions 16, flowing at least a portion of the thermoset portion 16 into pores in the thermoplastic panel 12 and cooling the panel assembly 10.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of making a panel assembly, the method comprising the steps of:
    a. forming a thermoplastic panel,
    b. placing a thermoset portion into a pocket in a mold,
    c. placing an attachment member into the pocket in the mold,
    d. positioning the thermoplastic panel in the mold,
    e. cooling the thermoplastic panel while heating the thermoset portion to flow at least a portion of the thermoset portion into openings defined in the thermoplastic panel, and
    f. cooling the panel assembly so that the thermoset portion hardens, thereby securing the attachment member to the thermoplastic panel.

2. The method of claim 1 wherein the panel assembly includes a plurality of thermoset portions and respective attachment members.

3. The method of claim 1 wherein during step d, the mold is maintained at a temperature of between 250° F. and 350° F.

4. The method of claim 1 wherein the panel assembly is an aircraft side panel or ceiling panel.

5. The method of claim 1 wherein the attachment member is comprised of metal.

6. The method of claim 1 wherein the attachment member comprises one of a bracket, a flange, a threaded fastener, a boss, a ring, an insert for receiving a threaded fastener, a slide-in strips, a holding mechanism for a slide-in strip, an anchor points for a window reveal or a receiver.

* * * * *